United States Patent
Eschbach et al.

(10) Patent No.: US 9,916,402 B2
(45) Date of Patent: *Mar. 13, 2018

(54) CREATION OF CUT FILES TO FIT A LARGE PACKAGE FLAT ON ONE OR MORE SUBSTRATES

(71) Applicant: Xerox Corporation, Norwalk, CT (US)

(72) Inventors: Reiner Eschbach, Webster, NY (US); Stephen C. Morgana, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 355 days.

This patent is subject to a terminal disclaimer.

(21) Appl. No.: 14/714,655

(22) Filed: May 18, 2015

(65) Prior Publication Data

US 2016/0342712 A1    Nov. 24, 2016

(51) Int. Cl.
*G06F 17/50*    (2006.01)

(52) U.S. Cl.
CPC .......... *G06F 17/50* (2013.01); *G06F 2217/38* (2013.01)

(58) Field of Classification Search
None
See application file for complete search history.

(56) References Cited

U.S. PATENT DOCUMENTS

| | | |
|---|---|---|
| 3,902,655 A | 9/1975 | Huffman |
| 5,235,519 A | 8/1993 | Miura |
| 5,291,583 A | 3/1994 | Bapat |
| 5,353,390 A | 10/1994 | Harrington |
| 5,457,904 A | 10/1995 | Colvin |
| 5,513,117 A | 4/1996 | Small |
| 5,518,574 A | 5/1996 | Yates et al. |
| 5,528,517 A | 6/1996 | Loken |

(Continued)

FOREIGN PATENT DOCUMENTS

| | | |
|---|---|---|
| EP | 621113 A1 | 10/1994 |
| WO | WO-2005000681 A2 | 1/2005 |

(Continued)

OTHER PUBLICATIONS

Lu et al., "Folding Cartons with Fixtures: A Motion Planning Approach", IEEE Transactions on Robotics and Automation, vol. 16, No. 4, Aug. 2000, pp. 346-356.

(Continued)

*Primary Examiner* — Omar Fernandez Rivas
*Assistant Examiner* — Cuong Luu
(74) *Attorney, Agent, or Firm* — Fox Rothschild LLP (57) ABSTRACT

A package design system creates one or more package design files by creating cut line instructions and fold line instructions for a package flat. If the system determines that the package flat should be split into two or more subparts across two or more substrates or two or more sub-regions of a single substrate, it will select a fold line and convert the selected fold line to a seam. Conversion to a seam may occur by creating cut line instructions for the selected fold line, imparting a first set of functional elements on a first side of the seam, and imparting a second set of functional elements on a second side of the seam. The first set of functional elements and the second set of functional elements will form a functional connection when the three-dimensional structure is formed.

18 Claims, 9 Drawing Sheets

(56) References Cited

U.S. PATENT DOCUMENTS

| | | | |
|---|---|---|---|
| 5,575,418 A * | 11/1996 | Wu | A23B 7/148 |
| | | | 229/120 |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |
| 5,923,556 A | 7/1999 | Harris | |
| 6,005,959 A | 12/1999 | Mohan et al. | |
| 6,090,027 A | 7/2000 | Brinkman | |
| 6,092,054 A | 7/2000 | Tackbary et al. | |
| 6,117,061 A | 9/2000 | Popat et al. | |
| 6,134,018 A | 10/2000 | Dziesietnik et al. | |
| 6,153,039 A | 11/2000 | Jacobsen | |
| 6,237,787 B1 | 5/2001 | Gallo et al. | |
| 6,243,172 B1 | 6/2001 | Gauthier et al. | |
| 6,246,468 B1 | 6/2001 | Dimsdale | |
| 6,332,149 B1 | 12/2001 | Warmus et al. | |
| 6,409,019 B1 | 6/2002 | Hornsby et al. | |
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |
| 6,896,250 B2 | 5/2005 | Hillebrand | |
| 6,939,063 B2 | 9/2005 | Bussell | |
| 6,945,645 B2 | 9/2005 | Baron | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,174,720 B2 | 2/2007 | Kennedy | |
| 7,191,392 B1 | 3/2007 | Coar | |
| 7,197,465 B1 | 3/2007 | Hu et al. | |
| 7,243,303 B2 | 7/2007 | Purvis et al. | |
| 7,293,652 B2 * | 11/2007 | Learn | B65D 5/0218 |
| | | | 206/497 |
| 7,327,362 B2 | 2/2008 | Grau | |
| 7,366,643 B2 | 4/2008 | Verdura et al. | |
| 7,367,027 B1 | 4/2008 | Chen et al. | |
| 7,406,194 B2 | 7/2008 | Aizikowitz et al. | |
| 7,413,175 B2 | 8/2008 | Levine et al. | |
| 7,446,404 B2 | 11/2008 | Huang et al. | |
| 7,647,752 B2 | 1/2010 | Magnell | |
| 7,832,560 B2 | 11/2010 | Tilton | |
| 7,941,465 B2 | 5/2011 | Gombert et al. | |
| 7,983,792 B2 * | 7/2011 | Gombert | B42D 1/00 |
| | | | 53/456 |
| 8,160,992 B2 * | 4/2012 | Gombert | G06N 5/02 |
| | | | 53/458 |
| 8,170,706 B2 * | 5/2012 | Gombert | G06F 17/50 |
| | | | 700/118 |
| 8,170,709 B2 | 5/2012 | Puissant | |
| 8,195,227 B1 | 6/2012 | Bushman et al. | |
| 8,869,083 B1 * | 10/2014 | Morgana | G06F 17/50 |
| | | | 716/110 |
| 8,994,734 B2 * | 3/2015 | Morgana | B65D 5/0227 |
| | | | 345/440 |
| 9,314,986 B2 * | 4/2016 | Morgana | B31B 1/00 |
| 2002/0085001 A1 | 7/2002 | Taylor | |
| 2002/0091592 A1 | 7/2002 | Sugiura et al. | |
| 2002/0104293 A1 | 8/2002 | Armington et al. | |
| 2002/0118874 A1 | 8/2002 | Chung et al. | |
| 2003/0035138 A1 | 2/2003 | Schilling | |
| 2003/0083763 A1 | 5/2003 | Kiyohara et al. | |
| 2003/0091227 A1 | 5/2003 | Chang et al. | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2004/0218799 A1 | 11/2004 | Mastie et al. | |
| 2005/0005261 A1 | 1/2005 | Severin | |
| 2005/0012949 A1 | 1/2005 | Kitahara et al. | |
| 2005/0050052 A1 | 3/2005 | Zimmerman et al. | |
| 2005/0132356 A1 | 6/2005 | Cross et al. | |
| 2005/0157342 A1 * | 7/2005 | Bru | G06F 17/50 |
| | | | 358/1.18 |
| 2005/0166744 A1 * | 8/2005 | Berge | B26D 5/005 |
| | | | 83/879 |
| 2005/0249400 A1 | 11/2005 | Fukumoto | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1 | 2/2007 | Rietjens et al. | |
| 2007/0055401 A1 * | 3/2007 | Van Bael | G06F 3/04845 |
| | | | 700/98 |
| 2007/0112460 A1 | 5/2007 | Kiselik | |
| 2008/0020916 A1 * | 1/2008 | Magnell | B65B 5/02 |
| | | | 493/65 |
| 2008/0048308 A1 | 2/2008 | Lam | |
| 2008/0255945 A1 | 10/2008 | Percival et al. | |
| 2008/0273945 A1 | 11/2008 | Levine et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0278843 A1 * | 11/2009 | Evans | G06F 17/50 |
| | | | 345/419 |
| 2009/0282782 A1 * | 11/2009 | Walker | B65D 5/0254 |
| | | | 53/410 |
| 2010/0060909 A1 | 3/2010 | Conescu et al. | |
| 2010/0098319 A1 | 4/2010 | Gombert et al. | |
| 2010/0110479 A1 | 5/2010 | Gombert et al. | |
| 2010/0214622 A1 | 8/2010 | Ruegg et al. | |
| 2010/0222908 A1 * | 9/2010 | Gombert | G06F 17/50 |
| | | | 700/98 |
| 2012/0015789 A1 * | 1/2012 | Harrington | G09F 3/02 |
| | | | 493/53 |
| 2013/0120767 A1 * | 5/2013 | Mandel | G06F 17/248 |
| | | | 358/1.6 |
| 2013/0120770 A1 * | 5/2013 | Mandel | G06Q 10/10 |
| | | | 358/1.9 |
| 2014/0038802 A1 * | 2/2014 | Clark | B26D 5/00 |
| | | | 493/11 |
| 2014/0040319 A1 * | 2/2014 | Morgana | G06F 17/5068 |
| | | | 707/803 |
| 2014/0121800 A1 * | 5/2014 | Morgana | B31B 1/00 |
| | | | 700/98 |
| 2014/0129018 A1 * | 5/2014 | Morgana | B65D 5/425 |
| | | | 700/98 |
| 2014/0139849 A1 | 5/2014 | Eschbach et al. | |

FOREIGN PATENT DOCUMENTS

| | | |
|---|---|---|
| WO | WO-2005054983 A2 | 6/2005 |
| WO | WO-2005122079 A2 | 12/2005 |
| WO | WO-2006108269 A1 | 10/2006 |
| WO | WO-2007021920 A2 | 2/2007 |

OTHER PUBLICATIONS http/www.esko.com/tmp/080606115325/G2558322_Kongsberg_tables_us_pdf Sep. 1, 2009.

* cited by examiner

CREATION OF CUT FILES TO FIT A LARGE PACKAGE FLAT ON ONE OR MORE SUBSTRATES

BACKGROUND

There has been significant interest in the manufacture of personalized packaging for small volume applications. Systems exist that allow an end user to create a package or similar three-dimensional structure by defining dimensions, and optionally also by providing some information about functionality. The system may create a small run of packages, or even a single package, after generating a cut file (which may also be referred to as a package design file) that includes rules and/or parameters that define the cuts and creases (fold lines) that the package generation equipment should impart to a substrate.

In real world applications a personalized package creation system will have a limited set of substrate sizes available for use in production. However, the desired package sizes may vary quite a bit. Not all desired structures may fit on the available substrates. Or, some structures may fit on an available substrate but only with a significant amount of wasted space.

This document describes methods and systems for improving automated package customization systems to address some or all of the issues described above.

SUMMARY

In various embodiments, a system includes a processor and a data storage facility containing instructions for creating one or more package design files. Each package design file may include programming instructions for creating a two-dimensional representation of a three-dimensional structure having a plurality of facets. The programming instructions are configured to cause the processor to identify a set of cut line instructions, each of which comprises a set of parameters pursuant to which a cutting device will impart a cut line on a substrate set. The programming instructions will also cause the system to identify a set of fold line instructions, each of which comprises a set of parameters pursuant to which a creasing device will impart a crease on the substrate set. The system may determine whether the two-dimensional representation of the three-dimensional structure should be arranged as a single package flat on a single available substrate. If the system determines that the two-dimensional representation of the three-dimensional structure should not be arranged as a single package flat on a single available substrate, then the system will identify a split location and impart a seam at the split location so that a first group of the facets of the three-dimensional structure corresponding to a first side of the seam will be imparted on a first available substrate or substrate region, and a second group of the facets of the three-dimensional structure corresponding to a second side of the seam will be imparted on a second available substrate or substrate region; and saving, to a computer readable medium as the one or more package design files, parameters for application of the first group of facets to the first available substrate or substrate region and parameters for application of the second group of facets to the second available substrate or substrate region.

Optionally, identifying the split location may include identifying a plurality of candidate split locations and selecting one or more of them as the location(s) at which to impart a seam. To do this, the system may select one of the fold lines as the split location. Then, to impart a seam at the split location, the system may create a set of cut line instructions for the selected fold line and replace the fold line instructions for the selected fold line with the created cut line instructions. The system may impart: (i) a first set of one or more functional elements on a first side of the selected fold line; and (ii) a second set of one or more functional elements on a second side of the selected fold line so that the first set of one or more functional elements and the second set of one or more functional elements will form a functional connection when the three-dimensional structure is formed.

The system may also determine whether a seam imparted at each candidate split location would adversely affect a functional connection of the three-dimensional structure, and it may only select a candidate split location as the split location at which the seam will be imparted if the seam will not adversely affect a functional connection of the three-dimensional structure. Alternatively or in addition, the system may determine whether a seam imparted at each candidate split location would adversely affect ease of assembly of the three-dimensional structure, and it may only select a candidate split location as the split location at which the seam will be imparted if the seam will not adversely affect ease of assembly of the three-dimensional structure. Alternatively or in addition, the system may determine, for each of the candidate split locations, a first area for a package flat portion that corresponds to a first side of the candidate split location and a second area for a package flat portion that corresponds to a second side of the candidate split location, and it may only select a candidate split location as the split location at which the seam will be imparted if the selected candidate split location's first area and second area do not differ by more than a threshold. Alternatively or in addition, the system may determine whether a seam imparted at each candidate split location would result in the seam connecting to a top facet or a front facet of the three-dimensional structure, and it may only select a candidate split location as the split location at which the seam will be imparted if the seam will not connect to a top facet or a front facet of the three-dimensional structure.

In addition, a processor may cause a cutting device and a creasing device to impart cut lines and fold lines for the first group of facets on the first available substrate or substrate region, as well as cut lines and fold lines for the second group of facets on the second available substrate or substrate region.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "package generation device" or "package generation system" is a machine or group of machines that includes one or more tools for imparting a cut, crease, and/or perforation on a substrate so that the substrate may be folded into a three-dimensional (3D) package, or into other 3D structures such as greeting cards. Optionally, a package generation system also may include a printing device for applying printed content to the package flat. This document may use to the term "package" in a general sense to refer to any 3D structure formed by a package generation device.

A "package flat" refers to a generally two-dimensional structure having two or more facets formed in a substrate by cut lines (such as perforations) and/or fold lines (such as creases and/or score lines). The substrate is typically (but not necessarily) a paper material, such as cardstock, cardboard, or paper having sufficient thickness to provide structural support when folded into a three-dimensional shape. The flat may be removed from the substrate at the cut lines, and the flat may then be folded into a three-dimensional structure having two or more sides. The actual three-dimensional shape of the package is subsequently created by folding and commonly connecting the facets that make up the flat.

A "functional element" of a package or package flat is a facet that has a functional property, typically (although not necessarily) for interconnecting two or more other facets. The functional element may or may not be visible in the closed package. (A visible facet may be referred to as a face of the package.) In general, functional elements may connect package facets, influence the assembly of the package and/or change a structural property of the assembled package as compared to the package flat. Examples of such properties include rigidity and dust protection. Examples of functional elements include tabs, slots, flaps, and the like. This document will generally use the term "tab" when referring to a functional element that connects with another element in a secure manner, such as with a tab-and-slot arrangement. It will generally use "flap" when referring to a functional element that covers or forms part of a seam in a manner that allows it to easily be opened, and thus it may not substantially contribute to stability.

The term "functional connection" refers to the structure formed by two or more interconnecting functional elements (as in tab-and-slot connection), or by an overlapping relationship between a functional element and one or more facets or other functional elements (as in a flap-and-lid relationship).

The terms "cut file" and "package design file" will be used interchangeably to refer to a file containing instructions and/or parameters for imparting cut lines, fold lines or both for a package flat on one or more substrates. The instructions for the package flat also may include instructions to print text or graphic content on one or more of the package's facets.

Package production may be performed by a package generation system that is capable of performing printing operations on, and applying creases and cuts to, a substrate. The system also may perform other actions such as coating and/or stacking the substrate. Examples of automated package generation systems include those in the iGen® series of digital production printing presses, available from Xerox Corporation, in connection with corresponding finishing devices. Other systems may include smaller printing devices, such as a Xerox DocuColor® 250, or a digital cutter as offered by a variety of manufacturers.

Figure 1:
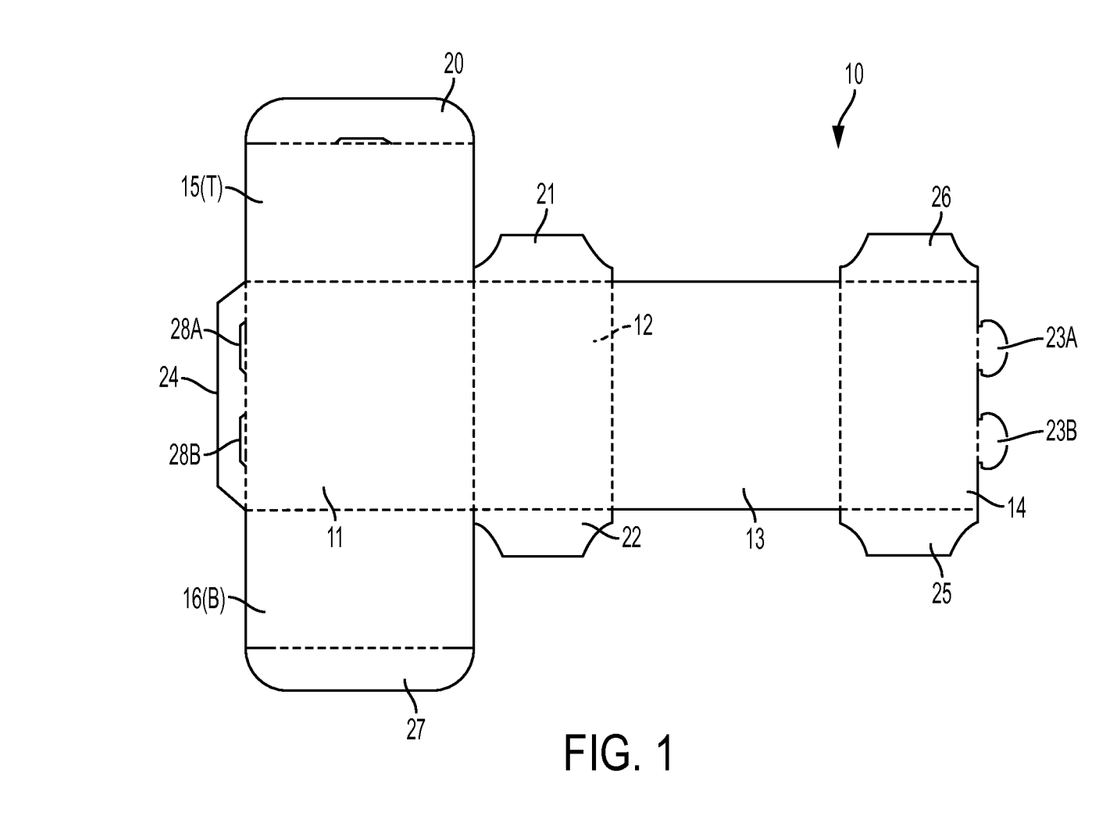
FIG. 1 depicts an example of a package flat.

FIG. 1 shows a common package flat 10, in this case a rectangular box, with a variety of facets 11-24 as they may be commonly envisioned by a human. Some of the facets may serve as external faces such as sidewalls or lids of the finished package. (See, for example, facets 11-16.) Other facets may serve as functional elements in that they provide a supporting structure by interlocking with other functional elements. (See, for example, tabs 23A and 23B, and facet 24 which includes slots 28A and 28B.) Some facets may be both faces and functional elements. (See, for example, flaps 20-27.)

To define the package, a package generation system or computing device may provide a user interface that allows a user to enter dimensional and functional information. The system may then use that information to create a package definition file containing instructions for cut lines and fold lines that package generation equipment may use to construct the package flat. In FIG. 1, the cut lines are represented by solid lines, and the fold lines are illustrated by dashed lines. Different equipment, or different settings on one or more pieces of equipment, may be used to impart a cut line than would be used to impart a fold line. For example, a cut line may be imparted using a knife with sufficient force to cut through the substrate. A fold line may be imparted with a creasing device such as a roller that will apply a crease or a knife that uses a reduced cutting force and does not cut all the way through the substrate, or by another means.

In the example of FIG. 1, the user may have entered (or the system may have otherwise received) dimensional information such as height, width and depth. The user or other source also may have provided functional requirements such as a lid and locking floor. Or, the user may have identified (or the system may have received) a package intent, and the system may have used the intent to determine appropriate dimensions and shapes. The system may use this information to define the facets and functional elements. Note that in the example of FIG. 1, the location of the various facets may vary, as facets 15 (corresponding to a top lid T) and 16 (corresponding to a bottom lid B) could be attached to facet 13 instead of facet 11 without altering the resulting three-dimensional structure, so long as the corresponding functional elements 20 and 27 follow the move.

As noted above, functional elements are facets (or portions of facets) that have a functional property for the three dimensional structure, and may or may not be visible in the closed package. Examples of such functional properties include rigidity and dust protection. This document will use the term "tab" when referring to a functional element that connects with another element in a secure manner, such as with a tab-and slot arrangement. It will use "flap" when referring to a functional element that covers a seam in a manner that allows it to easily be opened, and thus it may not substantially contribute to stability. Functional elements may not be fully defined by user input of dimensions such as height, width or depth, but rather are dynamically generated based on other dimensions, features and/or intended uses of the package.

Figure 2:
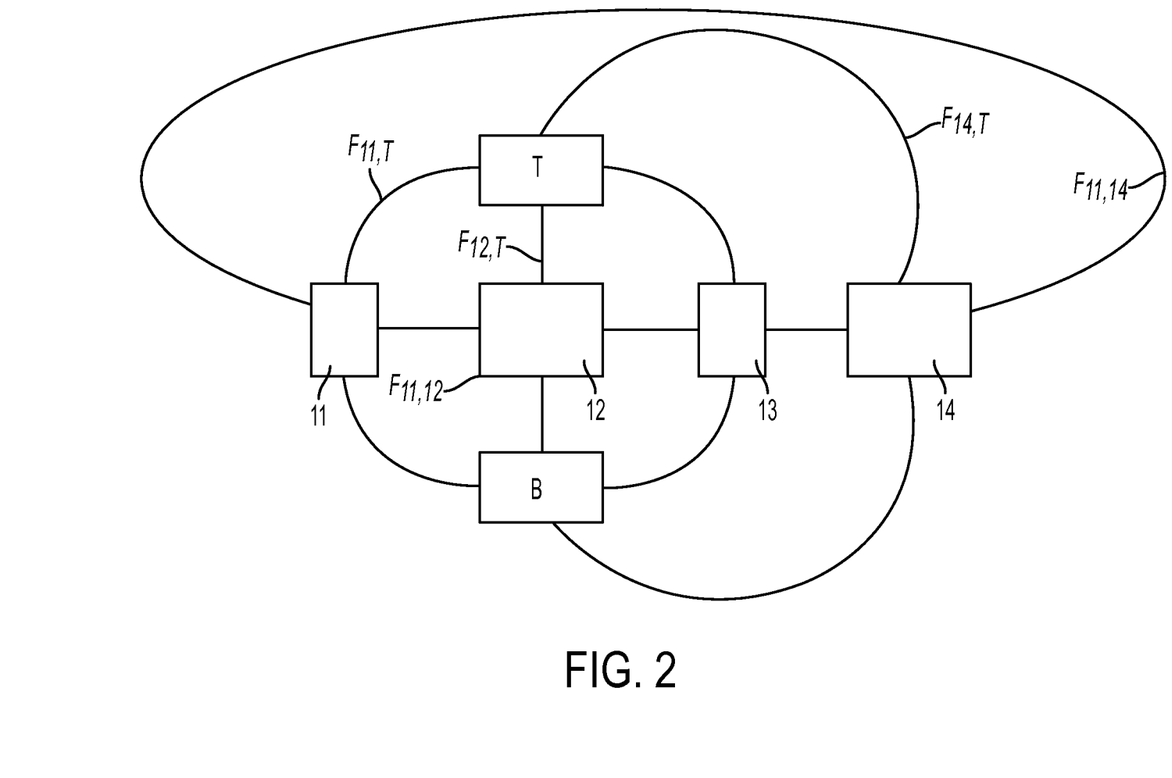
FIG. 2 is a graph representation of a portion of a package flat with relations between facets.

FIG. 2 is a graph representation of elements of a package flat, and it provides additional detail to illustrate the concepts of functional elements and functional connections. In FIG. 2, the lines connecting the faces with each other indicate that two faces will touch or connect along these edges to which the lines point. The lines in FIG. 2 are labeled F with a subscript indicating the faces that are connected. These represent the functional connections that will be described in more detail below. For example, the functional connection $F_{12,T}$ represents the place where the lid T is physically attached to the side face 12 of the three dimensional structure. As an actual functional element, this may be a fold, meaning that the cut file will indicate that a crease should be imparted on the substrate. In this example, no actual new physical piece will need to be added, although in other examples additional functional elements may form the functional connection. The functional connection $F_{11,T}$ describes a side of the lid and may represent a cut separation between the two faces, meaning that they are not connected by the substrate. In some cases $F_{11,T}$ also may include an additional media surface attached to face 11 to act as a dust flap. This dust flap is an example of a functional element that is derived from the functional connection.

Figure 3:
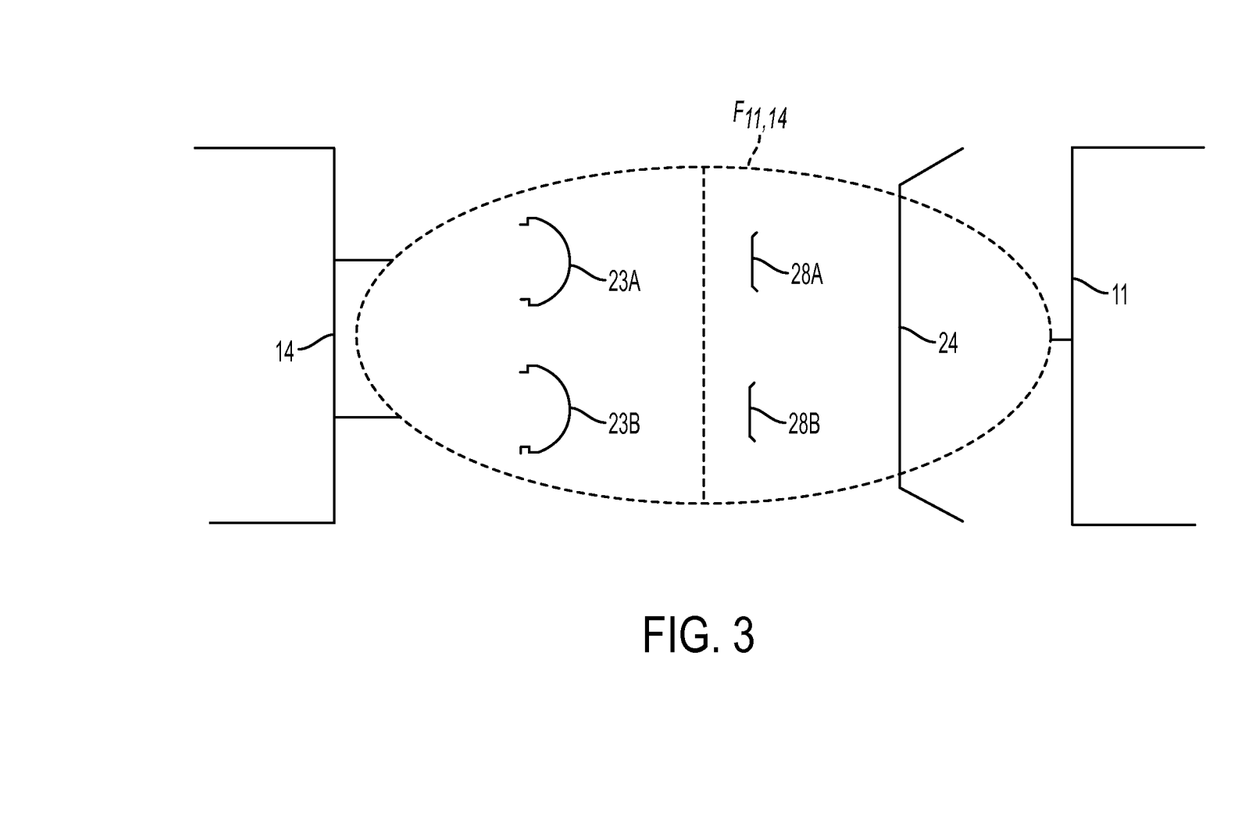
FIG. 3 illustrates an example of how functional elements may together form a functional connection.

FIG. 3 shows how functional elements may interconnect faces 11 and 14 of FIGS. 1 and 2. The two faces 11, 14 are functionally connected via functional connection $F_{11,14}$, which is made of various functional elements 23A, 23B, 24, 28A and 28B. In the final structure, all four sides are tightly connected to each other. Thus, it may seem that $F_{11,14}$ of FIG. 3 is identical to $F_{12,T}$ of FIG. 2, which is true in terms of connectivity, but not true in terms of the specific rules in the cut file. This is caused by representing the 3D package structure as a two dimensional (2D) package flat. There is no possibility to simply apply a fold between the two faces 11, 14 since they are at opposite ends of the package flat. Thus for the purpose of this disclosure we may define this as a "seam," and the system may add functional elements to connect the two faces when folded into a 3D structure. In this example of FIG. 3, $F_{11,14}$ is realized through five functional elements (23A, 23B, 24, 28A and 28B) with 23A and 23B being tabs (additional pieces of substrate), 24 being a large flap and 28A and 28B being additional cuts into the flap 24 that are configured to receive the tabs 23A and 23B. At this point the system may create the graph to create the cut file.

With a graph representation that incorporates functional elements and functional connections such as is shown in FIG. 3 (which this document may refer to as a functional element representation), a processor may create a rule set that includes instructions for applying cut and fold lines to define the functional elements and other elements of the package. The rule set may include instructions to alter the number and size/shape of functional elements or their components, to bind functional elements that are disjointed in a two-dimensional flat but joined in a three-dimensional space, and to create an outline cut. An example of an outline cut is shown by the outermost (solid) lines in the package flat 10 of FIG. 1.

To produce the cut line definitions for the outline of a package, a processor may first resolve all functional element links that map into nodes in the given the final package structure and dimensions, "walk" the graph representation by starting on any facet and selecting an edge that does not have a fold-connecting relationship to another facet. The system produces a cut command for that edge. It then follows adjacent edges in a clockwise direction, counter-clockwise direction, or another determined order for a sequence of adjacent non-fold edges, producing cut commands for them and continuing until it reaches an edge that has fold-connecting relationship with another facet. When that happens, the system steps in to that facet and looks to the counter-clockwise adjacent edge. The system then proceeds as it did for the previous facet, producing cut commands for sequences of non-fold edges and stepping through to the connected facet for fold edges. This continues until it returns to the starting point. In that manner the system defines the cut line commands for the outline of the box in a counter-clockwise order while stepping in an organized way through the graph. It should be noted that the invention is not limited to operation in a counter-clockwise direction, as the system may move in a clockwise direction as well.

To generate fold line instructions and other cut line instructions, the system may analyze each facet. In addition or alternatively, it may analyze each edge that is not part of the outline cut. Facets that have fold-connecting edges may receive fold line commands with kiss cuts, fold knife or other fold options selected. Edges that are not fold-connecting may receive cut line commands. Other methods of generating cut line and fold line instructions may be used.

The system may save the instructions and/or parameters for creating the cut and fold lines to a data file that a package generation system will use to create the package flat. In some situations, this data may need to dynamically change between proof and production runs based on differences in equipment used, desired package properties, different substrate properties, or other considerations.

Figure 4:
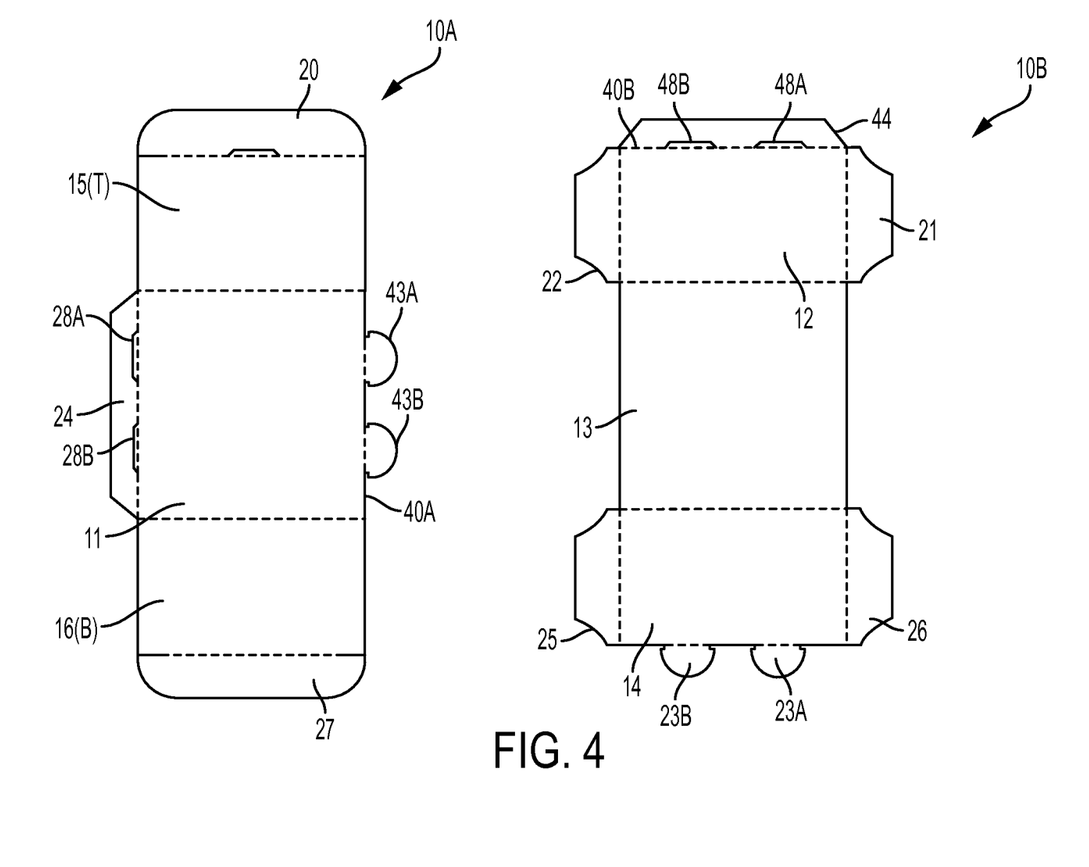
FIG. 4 illustrates an example of how a split may be applied in a horizontal configuration.

In some situations, it may be desirable that a cut file or set of cut files include rules to use multiple substrates for a single package. This may happen if, for example, the system determines that the package flat has one or more dimensions that are too large to fit on any substrate that is available to the system. In other situations when a package flat does not fit on an available substrate, it may be desirable to split the package flat in two but arrange the two subparts to fit on a single available substrate. A substrate that is "available" is one that is in inventory or expected to be in inventory of the package generation system (such as in a substrate bin), as well as within the technical capability of the system to process. Other reasons (such as efficiency of substrate use) may prompt the system to split a package flat and apply portions of the package flat to multiple substrates, or to separate regions of a single substrate. For example, if: (i) a package flat has a first lateral dimension (such as that of a y-axis) that will fit on a first substrate of size A and a second, larger substrate of size B; (ii) a second lateral dimension of the package flat (such as that of an x-axis) will only fit on the larger size B substrate; and (iii) the application of the package flat to the B substrate will yield at least a threshold percentage of wasted substrate, then the system may determine if less substrate will be wasted by splitting the package flat across two "size A" substrates, or on two or more regions of a single "size A" substrate. (An example of such a split is shown in FIG. 4, discussed below.) For example, the system may calculate the excess space resulting from using one "size B" substrate, subtract the excess space resulting from using two "size A" substrates, and determine that the cut file should be split and two "size A" substrates (or two or more regions of a single "size A" substrate) used if the result is a positive number.

The set of cut files for that splits the package flat in two will yield a 3D package structure with equivalent functional properties to that of a structure that would have been printed as a single package flat. The system may split the package flat in at least two ways, which this document will refer to as a horizontal split and a vertical split, although the labels "horizontal" and "vertical" are somewhat arbitrary, as the system may consider any direction to be horizontal so long as the vertical direction exhibits a 90 degree shift with respect to the horizontal. For example, "horizontal" may correspond to the x-axis or longest dimension of the substrate, and "vertical" may correspond to the y-axis or shortest dimension of the substrate.

In either the horizontal split or vertical situation, the system identifies a fold in the package flat that can be converted to a seam. A seam is a location where a fold line has been split for the purpose of creating the package flats, but which will be rejoined when the 3D package is formed from the package flats. The portion of the package flat that is present on one side of the seam will make up the first cut file and will be applied to a first substrate. The portion of the package flat that is present on the opposite side of the seam will make up the second cut file and will be applied to the second substrate. The system will automatically impart functional elements to the facets adjacent to each side of the seam so that the two package flat portions may interconnect and be used to form a single 3D package.

In the horizontal split scenario, the system may convert a fold line to a seam with a functional connection if it determines that the cut file will result in a package that exceeds the dimensions of the available substrates in a horizontal direction. For example, when considering the package of FIG. 1 or the graph representation of FIG. 2, the system will identify a fold line that is vertical (i.e., perpendicular to the direction having a dimension that exceeds the available substrate) and may select that fold line as the seam. In this example, there are three candidates for the split: (1) the connection between facets 11 and 12; (2) the connection between facets 12 and 13; and (3) the connection between facets 13 and 14. FIG. 1 shows that the connection between facets 11 and 14 is already split and already includes interconnecting functional elements.

The system may apply a set of programming instructions with rules for determining which of the folds should be converted to a seam. Factors that the rules may consider include, without limitation: (i) whether the conversion of a particular fold to a seam will adversely affect another functional connection of the 3D package; or (ii) whether the application of functional elements to a particular fold will affect ease of assembly of the 3D package. One way that the system may determine ease of assembly is to apply a rule that the package flat portion on one side of the seam not have an area that is substantially larger than that of the other package portion (as measured by surface area or one or more lateral dimensions). A package portion may be substantially larger than the other portion if it has a dimension or area that is more than a threshold amount larger than the other portion, or if the comparative values of the dimensions or areas of the two portions differ by more than a threshold percentage or amount. Another factor or criterion that the system may consider is a set of rules that govern the overall look and feel of the structure. An example of this is that a fold should not be converted to a seam if the seam will affect (e.g., connect to) a facet that is designated as the "top" or "front" of the 3D structure. An example of this will be described below.

Applying these rules to the example of FIGS. 1 and 2: (i) none of the three options will adversely affect another connection; and (ii) applying a split to $F_{13,14}$ (i.e., the connection between faces 13 and 14) will violate the ease of assembly rule since the package portion generated by the cut file for face 14 would be substantially smaller than the package portion generated by the cut file for faces 11-13. Thus, the folds corresponding to $F_{11,12}$ and $F_{12,13}$ are viable candidates based on the rules applied so far. The system may then determine whether applying a seam to $F_{11,12}$ or $F_{12,13}$ will affect a front-facing facet of the 3D structure. In the example of FIG. 1, top lid 15 and bottom lid 16 both open toward face 13 and include flaps that will rest against side 13 in the 3D structure. Thus, the system may consider face 13 to be the "front" of the structure and will avoid placing a seam adjacent to face 13. This disqualifies $F_{12,13}$ as a candidate for conversion to a seam, and the system will select $F_{11,12}$ as the fold that will be converted to a seam.

FIG. 4 illustrates how the package of FIG. 1 has been separated into two package portions 10A and 10B along two sides of a seam 40A and 40B. Package flat portion 10B has been rotated to fit on a substrate that is of the same size as that used for portion 10A. Each package portion may include its own cut file, or the system may include rules for both package portions in a single cut file. The system may identify functional elements 43A, 43B, 44, 48A and 48B to apply to each side of the seam so that the functional elements will form a functional connection. The system may apply any suitable rules for selecting and applying functional elements, such as those known to those of skill in the art and/or using the process described above in the context of FIGS. 2 and 3. For example, the system may identify a seam having similar properties as the seam to which the split has been applied, and it may impart functional elements to the selected seam that are similar to those present on the identified seam. In the example of FIG. 4, such a seam exists at the functional connection $F_{13,14}$.

Figure 5:
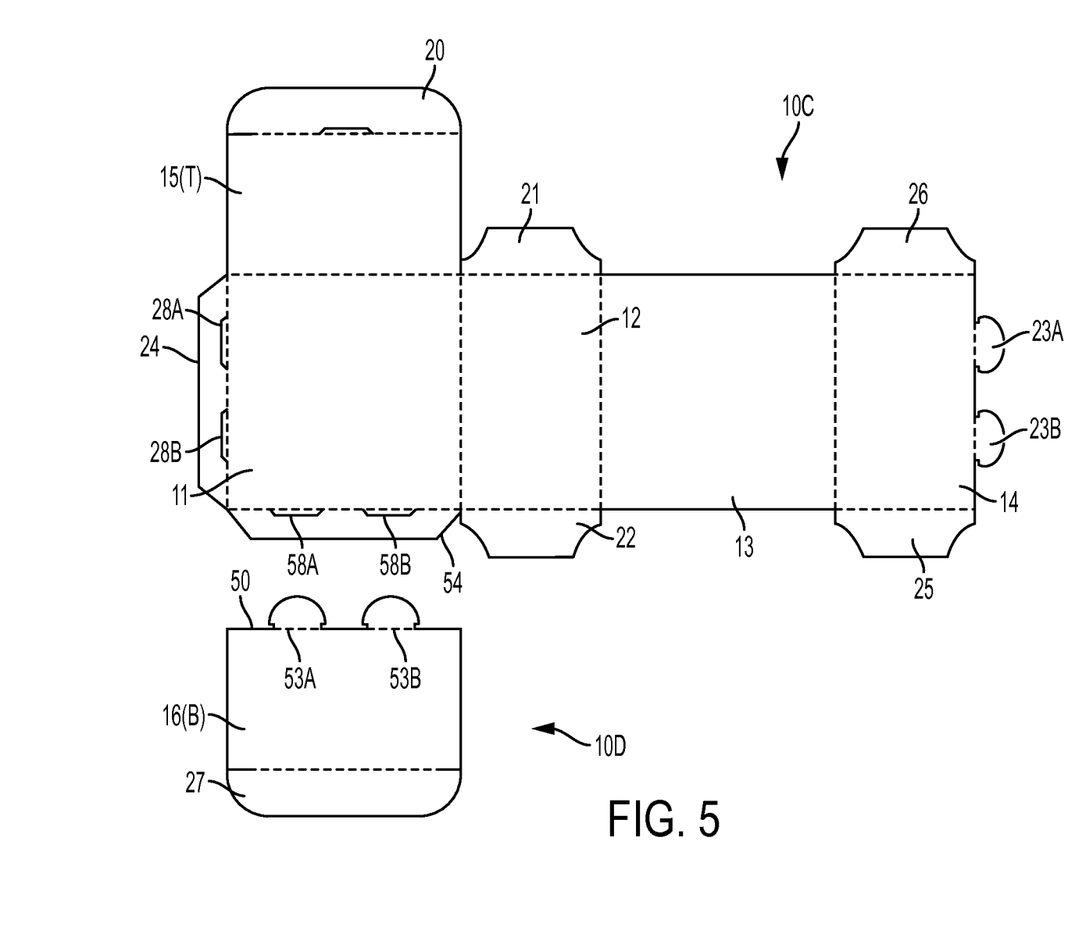
FIG. 5 illustrates an example of how a split may be applied in a vertical configuration.

FIG. 5 illustrates an example where the system has applied a vertical split so that the package flat has been split into an upper portion 10C and a lower portion 10D. Applying the rules discussed above for the horizontal split, the system would not apply a seam to any portion of the connection between the top 15 and the bottom 16 because it would adversely affect the functional connection that is present there. Thus, the available fold candidates for conversion to a seam are $F_{11,15}$ and $F_{11,16}$. The differential sizes of the resulting package portions will be substantially the same, so the system may apply a "look and feel" rule such as one that gives preference to applying a seam to a bottom facet over applying the seam to a top facet, or by giving preference to applying a seam to a back facet instead of to a front facet. Thus, the system will select $F_{11,16}$ instead of $F_{11,15}$. The system will apply functional elements 53A, 53B, 54, 58A and 58B to seam 50 using processes such as those described above.

Figure 6:
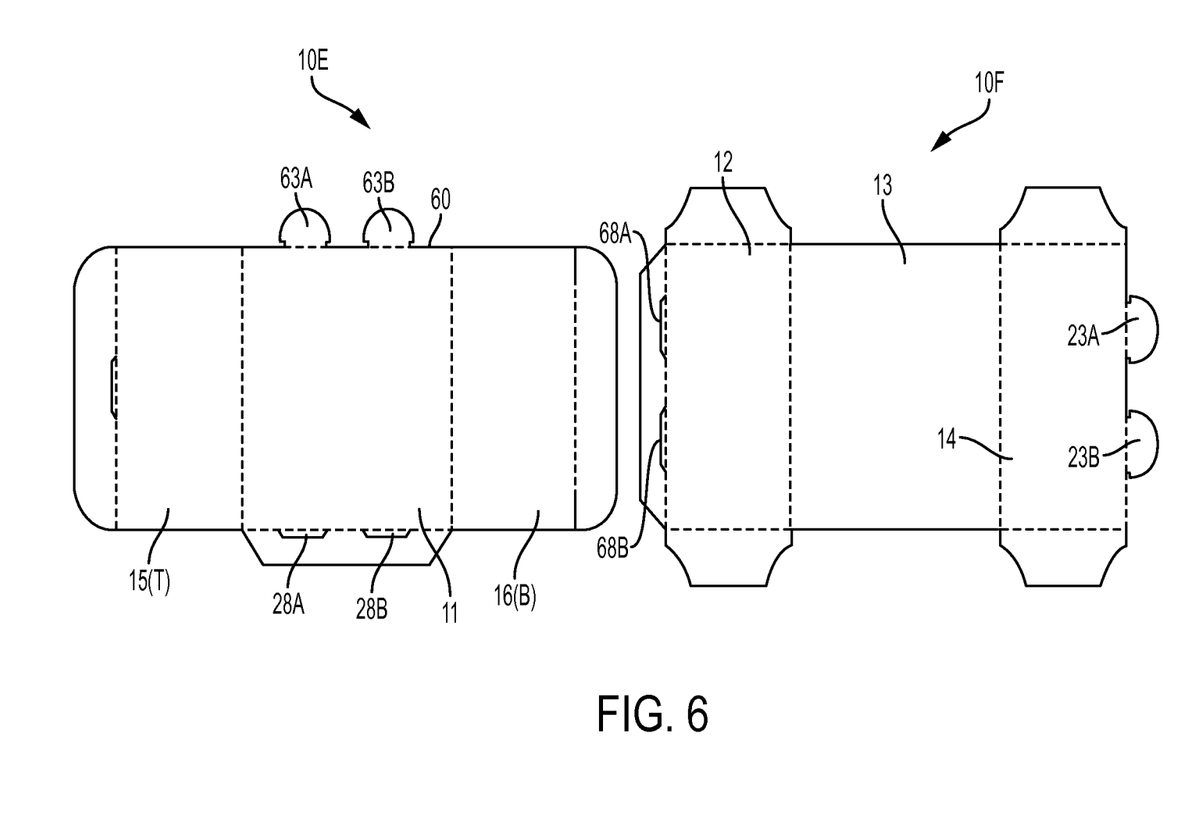
FIG. 6 illustrates an alternate example of a location for a split.

In the examples described above, the system distinguishes between horizontal size violations and vertical size violations. In practice, since a 2D cut file may not have an inherent "horizontal" or "vertical" direction, the system may simply select one axis to be vertical and one axis to be horizontal based on the aspect ratio between the cut file and the actual available substrate (e.g., short side of the package corresponding to short side of the sheet, and long side of the package corresponding to long side of the sheet). In a generalized case, the system may examine potential splits in both the horizontal and vertical directions. If so, the result shown in FIG. 5 may not be desirable because it will result in a relative size violation with package portion 10D being much smaller than that of package portion 10A. The system may then determine whether the relative size rule will be satisfied if a package portion is rotated in a 90 degree (or other) direction. This may result in a split such as that shown in FIG. 6, in which cut files 10E and 10F exhibit substantially equal sizes. In FIG. 6, the seam 60 has taken the place of the fold that was between faces 11 and 12, and the system has added a functional connection in the form of tabs 63A, 63B and slots 68A, 68B to the seam.

Figure 7:
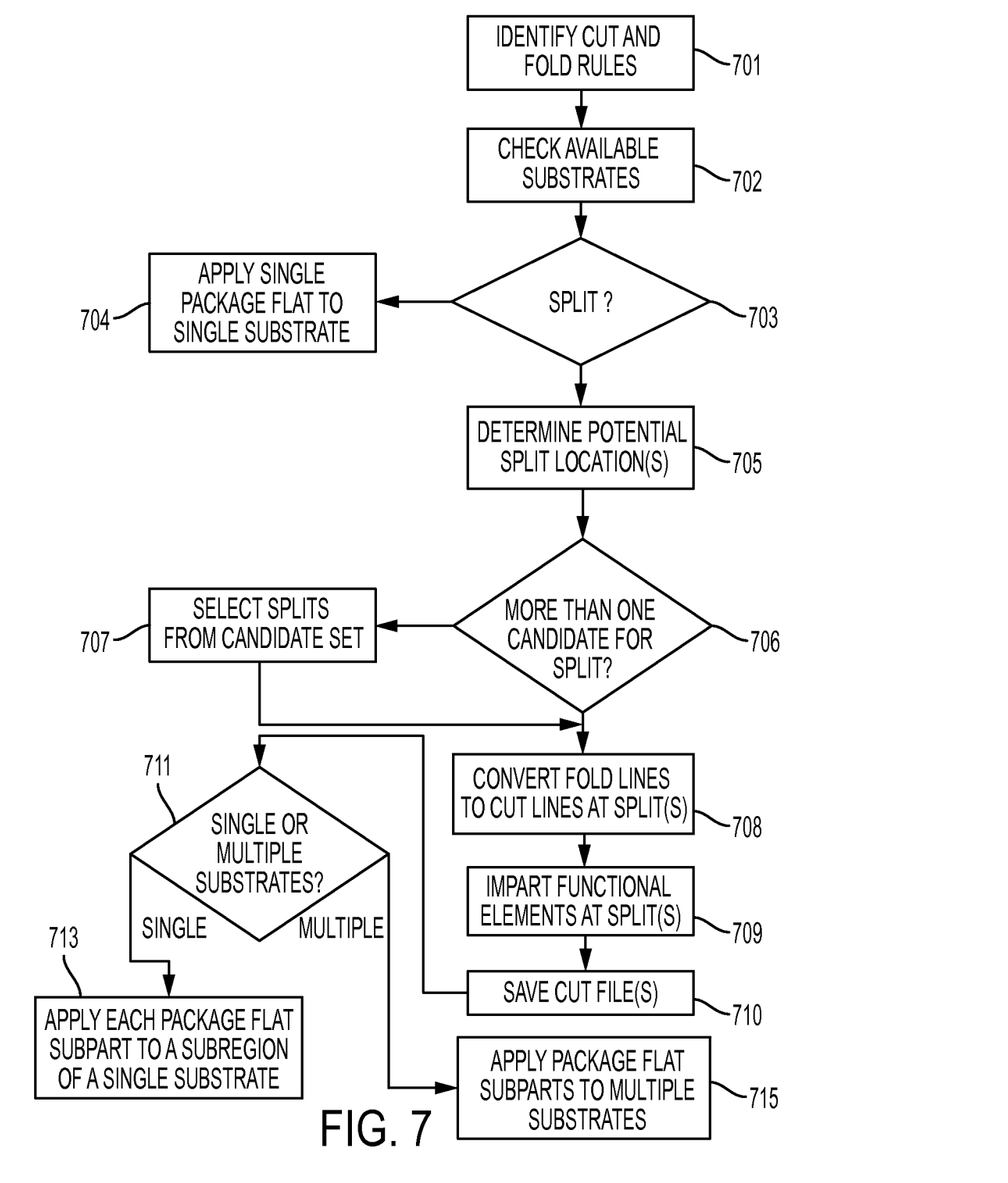
FIG. 7 is a flowchart illustrating a method of creating one or more package design files and using the file(s) to create a package flat.

FIG. 7 illustrates steps that a package definition system may follow when creating a set of cut files for creating a three-dimensional package using multiple package flat subparts. The system may identify a set of cut line instructions and fold line instructions for the package flat 701. The cut line instructions include parameters pursuant to which a device of the package generation system will impart a cut line on a set of one or more substrates. The fold line instructions will include parameters pursuant to which a device of the package generation system will impart a crease on the substrate(s). The system may identify the cut and fold line instructions 701 by creating them using a process such as that described above in the discussion of FIGS. 1-3 in response to a set of input parameters. Or, the system may receive them via user input, or it may load a cut file containing an existing instruction set.

The system will then check the sizes of available substrates 702 and, based on the available substrate sizes, determine whether the package flat should be split so that two or more substrates or sub-regions of a single substrate should be used to create the package flat 703. The system may check available substrate sizes 702 based on any suitable inputs, such as an instruction set or data set that contains an inventory sensor, based on one or more sensors that detect whether one or more paper sizes are present in an assigned bin, or other processes. The system may determine whether the package flat should be split 703 by determining whether the package flat satisfies a rule indicating whether the package flat may be arranged on a single available substrate, or whether the package flat should be split. For example, as discussed above, if the package flat will not fit across any available substrate, the system may determine that the package flat should be split across two or more substrates, or split into subparts that are individually applied to single sub-regions of a single available substrate. As another example, if applying the package flat to a substrate of a first size will result in more than a threshold amount of wasted substrate area, but splitting the package flat across two or more smaller substrates or across two subparts of a substrate of a different size will reduce wasted substrate area to be below the threshold, the system may determine that the package flat should be split into two or more subparts. This calculation may be done using a formula such as, for each substrate option: (1) determining the amount of total substrate surface area, (2) subtracting the amount of substrate area taken up by the package flat (or package flat components), and (3) determining which substrate option results in the lowest value. Other rules may also be used.

If the system determines that two or more package flat subparts are not required (e.g., if the package flat will completely fit on an available substrate and optionally satisfy additional layout rules such as rules against wasted substrate area), the system will generate a single cut file and apply the cut lines and fold lines to a single sheet of the appropriate available substrate 704. However, if the system determines that the package flat should be split into two or more subparts, then it will determine one or more potential split locations 705. As noted above, a split location is one where the system may convert a fold line to a seam. The seam will includes one or more cut lines, along with functional elements that will together form a functional connection across the split.

If multiple candidate split locations are available 706, then the system may apply a rule set to select one or more of the candidate split locations to determine the fold lines that it will actually convert 707. One or more rule sets may be applied in step 707.

Figure 8:
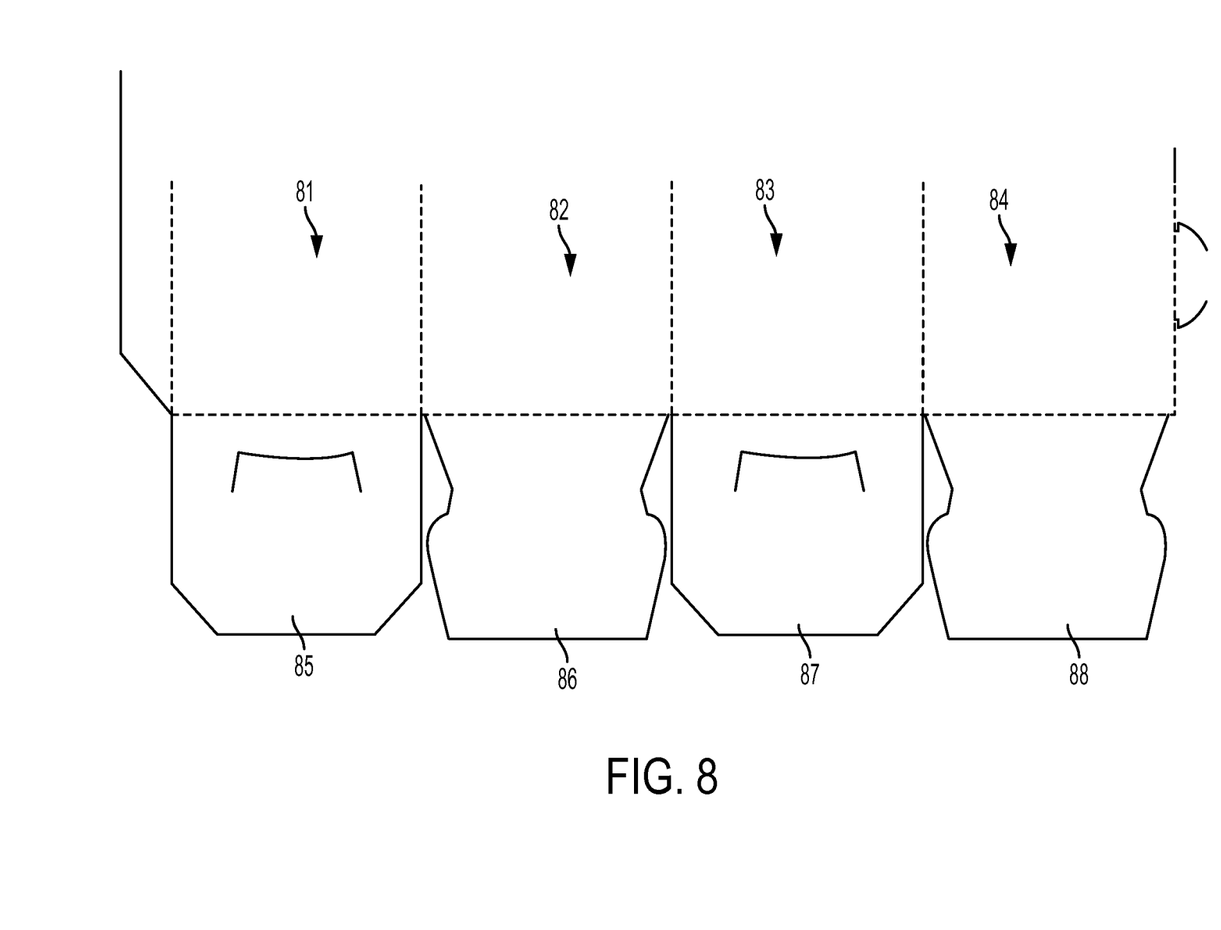
FIG. 8 illustrates an additional example of how various functional elements may form a functional connection.

For example, in step 707 the system may determine whether each of the candidate split locations, if converted to a seam, will adversely affect a functional connection of the three-dimensional structure. It will then only select a candidate split locations as the fold line that should be converted to a seam if the selected candidate split locations will not adversely affect a functional connection of the package if converted to a seam. An example of an adverse effect is illustrated in FIG. 8, in which a package has four faces 81-84, and each face has a connected functional element 85-88 which together form the functional connection of a box bottom. The system may try to avoid a split like that shown in FIG. 8, as all four facets would need to interlock, which could adversely affect ease of assembly when compared to a structure in which only two facets need to interlock.

Returning to FIG. 7, another example of a rule set for selecting a split location from a set of candidate locations (step 707) is one in which the system determines whether each of the candidate fold lines, if converted to a seam, will adversely affect ease of assembly of the three-dimensional structure. The rule set may indicate that the system should only select a candidate fold line as the fold line that should be converted to a seam if the selected candidate fold line will not adversely affect ease of assembly of the three-dimensional structure. For example, the system may determine a first area for a package flat portion that corresponds to a first side of the fold line that is a candidate for the split, determine a second area for a package flat portion that corresponds to a second side of the fold line, and only select a candidate fold line as the fold line that should be converted to a seam if the selected candidate fold line's first area and second area do not differ by more than a threshold.

As another example of a rule for selecting the split location (i.e., a fold line) that should be converted to a seam, the system may determine whether conversion of the candidate fold line to a seam will result in a seam that violates a "look and feel" rule. An example of such a rule is one that prevents application of a seam that connects to a top facet or a front facet of the three-dimensional structure. If so, then the system may only select a candidate fold line as the fold line that should be converted to a seam if conversion of the candidate fold line to a seam will not violate the look and feel rule (e.g., it will not result in a seam connecting to a top facet or a front facet of the three-dimensional structure).

Once the system selects a fold line to convert to a seam, it will convert the selected fold line(s) to one or more cut line(s) at the split location(s) 708, generate rules to impart functional elements on each side of the split location(s) 709 so that the functional elements will form a functional connection of the three-dimensional package, and save the rule set for each resulting package portion to a computer-readable memory as one or more cut files 710.

The system may also determine whether to apply the package flat subparts to a single substrate or to multiple substrates 711. For example, the system may divide each available single available substrate into sub-regions, and determine whether each subpart of the package flat (i.e., the parts on each side of the split) will fit into the sub-regions of the available substrate. It may do determine the sub-regions using any suitable process. For example, the sub-regions may be pre-defined, or the system may define the sub-regions after the first package flat subpart is applied to the substrate, so that the first sub-region is the area that contains the first package flat sub-part and the second sub-region is the area that contains the second package flat subpart. The system may rotate one or both of the subparts when determining whether they would fit into a sub-region. If all package flat subparts will fit into sub-regions of a single available substrate, then the system may generate the cut files so that all of the package flat subparts are applied to the single substrate 713. If not, then the system may generate cut files that require separate substrates for two or more of the package flat subparts 715.

Finally, the system may generate the package flat components by using the cut files to impart cut lines and fold lines across the single substrate 713 or across the multiple substrates 715. The system may do this by executing the cut files(s) that cause the system to use a cutting device and a creasing device to impart cut lines and fold lines for a first group of facets on a first side of the split location on the first substrate (or the first region of a single substrate). It will also use the cutting device and the creasing device to impart cut lines and fold lines for a second group of facets on a second side of the split location on the second substrate (or the second region of the single substrate). Thus, in this context, "multiple substrates" could optionally include separate and distinct portions of a single substrate.

Figure 9:
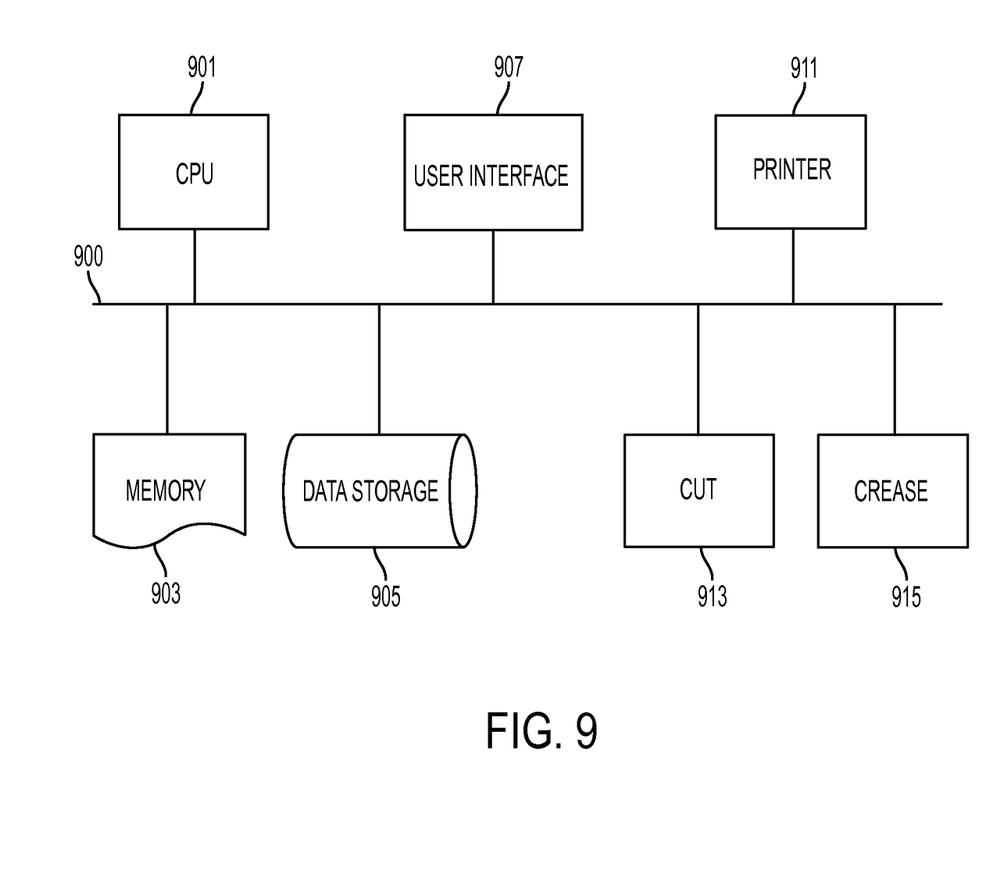
FIG. 9 is a block diagram showing various equipment that may be used to implement various embodiments of the processes described in this document.

FIG. 9 depicts a block diagram of hardware and/or electronics that may make up a package definition and/or production system. One or more communications lines 900 such as a bus or network interconnect the illustrated components and allow data and/or signals to flow between the components. CPU 901 represents one or more processors that perform calculations and logic operations required to execute a program. Any number of processors may be available, and they may be part of a single electronic device or distributed across any number of networked electronic devices. The processor(s) may access a computer-readable memory device 903 containing programming instructions, along with a data storage facility 905 such as a database that stores the package generation templates and/or rule sets.

When this document and any claim uses the term "processor," then unless specifically stated otherwise it is intended to refer to all such embodiments (i.e., single processor or multiple processors). When this document or any claim in the document uses the term "computer-readable memory," "computer-readable medium," "data storage facility" or similar phrases, then unless specifically stated otherwise it is intended to refer to embodiment that include a single device, embodiments in which data is distributed across multiple devices, and embodiments relating to various sectors of a single device.

A user interface 907 is a device or system that provides output to, and receives input from, a user. The user interface may include a display, audio output, a printer, or another element that provides information to a user. The user interface 907 also may include a touch-sensitive component, microphone, audio port, keyboard, mouse, touch pad, or other input mechanism that is capable of receiving user input.

The system also may include a package generation device, which may include some or all of the following elements: a printer 911, a knife or other cutting device 913, and a roller or other device 915 capable of imparting a crease in a substrate.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating a three-dimensional package, comprising:
    by a processor, creating one or more package design files comprising rules for a two-dimensional representation of a three-dimensional structure having a plurality of facets by:
        identifying parameters pursuant to which a package generation system will impart cut lines and fold lines on one or more substrates to form the three-dimensional structure;
        determining that the two-dimensional representation of the three-dimensional structure should not be arranged as a single package flat on a single available substrate;
        identifying a split location;
        imparting a seam at the split location so that:
            a first group of facets of the three-dimensional structure corresponding to a first side of the seam will be imparted on a first available substrate or substrate region, and
            a second group of facets of the three-dimensional structure corresponding to a second side of the seam will be imparted on a second available substrate or substrate region; and
        saving, to a non-transitory computer readable medium as the one or more package design files, parameters for application of the first group of facets to the first available substrate or substrate region and parameters for application of the second group of facets to the second available substrate or substrate region; and
    by the package generation device, imparting cut lines and fold lines on the first and second available substrates or substrate regions according to the parameters in the one or more package design files.

2. The method of claim 1, wherein the determining that the single two-dimensional representation should not be arranged as a single package flat on a single available substrate comprises determining that the single package flat has a dimension that is too large to fit on any available substrate.

3. The method of claim 1, wherein determining that the single two-dimensional representation should not be arranged as a single package flat on a single available substrate comprises:
    determining that an amount of wasted substrate that would result if the single package flat were applied to the single available substrate is more than an amount of wasted substrate that will result if the package flat were is split into package flat subparts and applied to multiple substrates or substrate regions.

4. The method of claim 1, wherein identifying the split location comprises:
- identifying a plurality of candidate split locations;
- determining, for each of the candidate split locations, if a seam imparted at the split location would adversely affect a functional connection of the three-dimensional structure; and
- only selecting a candidate split location as the split location at which the seam will be imparted if the seam will not adversely affect a functional connection of the three-dimensional structure.

5. The method of claim 1, wherein identifying the split location comprises:
- identifying a plurality of candidate split locations;
- determining, for each of the candidate split locations, if a seam imparted at the split location would adversely affect ease of assembly of the three-dimensional structure; and
- only selecting a candidate split location as the split location at which the seam will be imparted if the seam will not adversely affect ease of assembly of the three-dimensional structure.

6. The method of claim 1, wherein identifying the split location comprises:
- identifying a plurality of candidate split locations;
- for each of the candidate split locations, determining a first area for a package flat portion that corresponds to a first side of the candidate split location and determining a second area for a package flat portion that corresponds to a second side of the candidate split location; and
- only selecting a candidate split location as the split location at which the seam will be imparted if the selected candidate split location's first area and second area do not differ by more than a threshold.

7. The method of claim 1, wherein identifying the split location comprises:
- identifying a plurality of candidate split locations;
- determining, for each of the candidate split locations, if a seam imparted at the split location would result in the seam connecting to a top facet or a front facet of the three-dimensional structure; and
- only selecting a candidate split location as the split location at which the seam will be imparted if the seam will not connect to a top facet or a front facet of the three-dimensional structure.

8. The method of claim 1, wherein imparting the cut lines and fold lines further comprises, by a processor, executing the one or more package design files by:
- causing a cutting device and a creasing device of the package generation device to impart cut lines and fold lines for the first group of facets on the first available substrate or substrate region; and
- causing the cutting device and the creasing device to impart cut lines and fold lines for the second group of facets on the second available substrate or substrate region.

9. The method of claim 1, wherein:
- identifying the split location comprises selecting one of the fold lines as the split location; and
- imparting a seam at the split location comprises:
  - creating a set of cut line instructions for the selected fold line and replacing the fold line instructions for the selected fold line with the created cut line instructions,
  - imparting a first set of one or more functional elements on a first side of the selected fold line, and
  - imparting a second set of one or more functional elements on a second side of the selected fold line so that the first set of one or more functional elements and the second set of one or more functional elements will form a functional connection when the three-dimensional structure is formed.

10. A system for generating one or more packages from one or more package design files, comprising:
- a processor;
- a package generation device; and
- a data storage facility containing instructions for creating one or more package design files comprising rules for creating a two-dimensional representation of a three-dimensional structure having a plurality of facets, in which the instructions are configured to cause the processor to:
  - identify a set of cut line instructions, each of which comprises a set of parameters pursuant to which a cutting device will impart a cut line on one or more substrates;
  - identify a set of fold line instructions, each of which comprises a set of parameters pursuant to which a creasing device will impart a crease on the one or more substrates;
  - determine whether the two-dimensional representation of the three-dimensional structure should be arranged as a single package flat on a single available substrate;
  - in response to determining that the two-dimensional representation of the three-dimensional structure should not be arranged as a single package flat on a single available substrate, identify a split location;
  - impart a seam at the split location so that:
    - a first group of facets of the three-dimensional structure corresponding to a first side of the seam will be applied to a first available substrate or substrate region, and
    - a second group of facets of the three-dimensional structure corresponding to a second side of the seam will be applied to a second available substrate or substrate region; and
  - save, to a non-transitory computer readable medium as the one or more package design files, the cut line instructions, the fold line instructions, instructions for application of the first group of facets to the first available substrate or substrate region, and instructions for application of the second group of facets to the second available substrate or substrate region; and
  - cause the package generation device to impart cut lines and fold lines on the first and second available substrates or substrate regions according to the parameters in the one or more package design files.

11. The system of claim 10, wherein:
- the instructions to identify the split location comprise instructions to select one of the fold lines as the split location;
- the instructions to impart the seam at the split location comprise instructions to:
  - create a set of cut line instructions for the selected fold line and replacing the fold line instructions for the selected fold line with the created cut line instructions,
  - impart a first set of one or more functional elements on a first side of the selected fold line, and
  - impart a second set of one or more functional elements on a second side of the selected fold line so that the first set of one or more functional elements and the second set of one or more functional elements will form a functional connection when the three-dimensional structure is formed; and the instructions to save the one or more package design files also include instructions corresponding to the first and second sets of functional elements to the one or more package design files.

12. The system of claim 10:

wherein the package generation device comprises the cutting device and the creasing device; and wherein the data storage facility contains additional instructions that are configured to:

cause the cutting device to impart cut lines for the first group of facets on the first available substrate or substrate region, and to impart cut lines for the second group of facets on the second available substrate or substrate region, and     cause the creasing device to impart fold lines for the first group of facets on the first substrate, and to impart fold lines for the second group of facets on the second available substrate or substrate region.

13. The system of claim 10, wherein the instructions for determining whether the two-dimensional representation of the three-dimensional structure should be arranged as a single package flat on a single available substrate comprise instructions to:

determine whether the single two-dimensional representation of the three dimensional structure would have a dimension that is too large to fit on any available substrate; and     if so, determine that the two-dimensional representation of the three-dimensional structure should not be arranged as a single package flat on a single available substrate.

14. The system of claim 10, wherein the instructions for determining whether the two-dimensional representation of the three-dimensional structure should be arranged as a single package flat on a single available substrate comprise instructions to:

determine whether an amount of wasted substrate that would result if the single package flat were applied to the single available substrate is more than an amount of wasted substrate that will result if the two-dimensional representation were split and applied to multiple substrates or substrate regions as package flat subparts.

15. The system of claim 10, wherein the instructions for selecting the fold line that should be converted to a seam comprise instructions to:

identify a plurality of candidate fold lines;

determine whether each of the candidate fold lines, if converted to a seam, will adversely affect a functional connection of the three-dimensional structure; and     only select a candidate fold line as the fold line that should be converted to a seam if the selected candidate fold line will not adversely affect a functional connection of the three-dimensional structure if converted to a seam.

16. The system of claim 10, wherein the instructions for selecting the fold line that should be converted to a seam comprise instructions to:

identify a plurality of candidate fold lines;

determine whether each of the candidate fold lines, if converted to a seam, will adversely affect ease of assembly of the three-dimensional structure; and     only select a candidate fold line as the fold line that should be converted to a seam if the selected candidate fold line will not adversely affect ease of assembly of the three-dimensional structure.

17. The system of claim 10, wherein the instructions for selecting the fold line that should be converted to a seam comprise instructions to:

identify a plurality of candidate fold lines;

for each of the candidate fold lines, determine a first area for a package flat portion that corresponds to a first side of the candidate fold line and determine a second area for a package flat portion that corresponds to a second side of the candidate fold line; and     only select a candidate fold line as the fold line that should be converted to a seam if the selected candidate fold line's first area and second area do not differ by more than a threshold.

18. The system of claim 10, wherein the instructions for selecting the fold line that should be converted to a seam comprise instructions to:

identify a plurality of candidate fold lines;

for each of the candidate fold lines, determine whether conversion of the candidate fold line to a seam will result in a seam connecting to a top facet or a front facet of the three-dimensional structure; and     only select a candidate fold line as the fold line that should be converted to a seam if conversion of the candidate fold line to a seam will not result in a seam connecting to a top facet or a front facet of the three-dimensional structure.

\* \* \* \* \*